June 17, 1952      E. FIELDS      2,600,984
ANIMATED MECHANICAL TOY
Filed Sept. 17, 1948
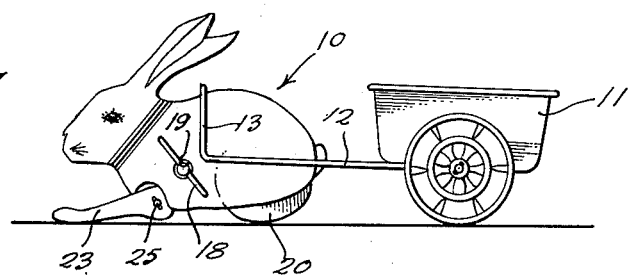
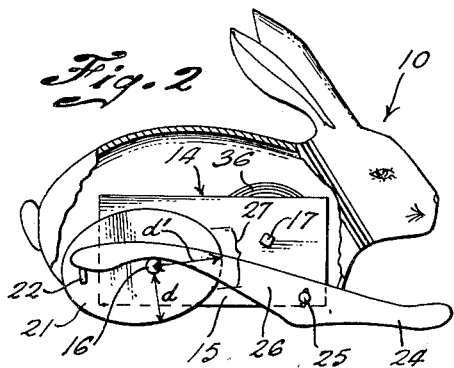
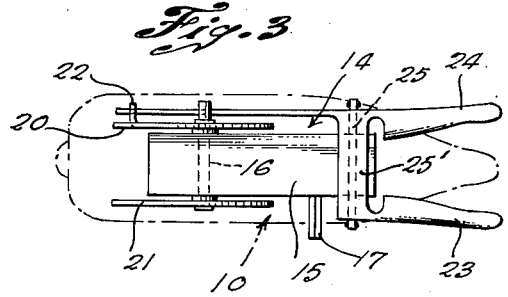
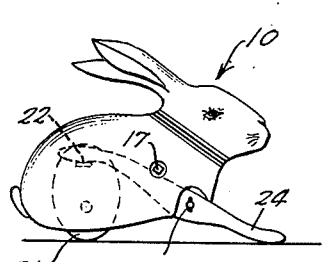
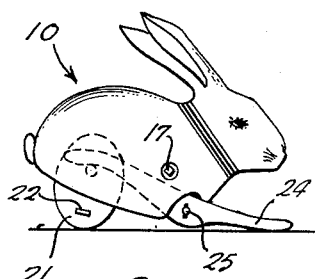
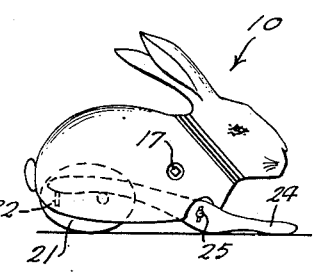
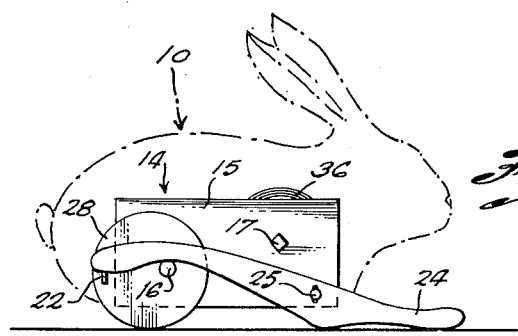
INVENTOR.
ERNEST FIELDS
ATTORNEY.

Patented June 17, 1952

2,600,984

UNITED STATES PATENT OFFICE 2,600,984

ANIMATED MECHANICAL TOY

Ernest Fields, New York, N. Y.

Application September 17, 1948, Serial No. 49,720

1 Claim. (Cl. 46—104)

This invention relates to spring actuated movements for mechanical toys, particularly to spring actuated movements for animated mechanical toys.

One of the objects of the invention is to provide a novel and improved movement of the general type, above referred to, causing an animal or other figure with which the movement is associated to move in a predetermined manner.

Another object of the invention is to provide a novel and improved movement of the general type, above referred to, causing an animal or other figure with which the movement is associated to move on a base by jerking up and down motions, thereby presenting an amusing and interesting toy to a playing child.

Another object of the invention is to provide a novel and improved movement of the general type, above referred to, which when mounted on the figure of an animal causes the animal figure to move in a manner simulating to a certain extent the natural movements of the animal in question.

Another object of the invention, allied with the preceding one, is to provide a novel and improved movement of the general type, above referred to, which causes the animal figure to move in a hopping manner, thereby simulating for instance the movements of an animal of a rabbit type.

Another object of the invention is to provide a novel and improved toy animal of the general type, above referred to, which by its varied and naturally appearing motions presents a toy of great play and entertainment value.

Another object of the invention is to provide a novel and improved movement of the general type, above referred to, which permits to impart diversified and comparatively intricate motions to a toy figure associated with the movement by simple and inexpensive means.

Other and further objects, features and advantages of the invention will be pointed out hereinafter and set forth in the appended claim forming part of the application.

On the accompanying drawing several now preferred embodiments of the invention are shown by way of illustration and not by way of limitation.

In the drawing:

Fig. 1 is an elevational view of an animated toy animal according to the invention pulling a little wagon.

Fig. 2 is a sectional elevational view of the toy animal showing the movement in detail.

Fig. 3 is a bottom view of Fig. 2.

Figs. 4, 5 and 6 show the toy animal in different positions, and

Fig. 7 is a view similar to Fig. 2 showing a modification of the movement.

Referring now to the figures in detail, an animated mechanical toy according to the invention is shown as a rabbit, generally designated by 10. However, it should be understood that the movement may be associated with various forms of shaped bodies and that the shape of a rabbit has been selected only because the movement according to the invention lends itself particularly well to imitate the natural hopping motions of a rabbit. Rabbit 10 is shown as pulling a little two-wheeled wagon 11 detachably harnessed to the rabbit by means of two drag poles 12 joined by a yoke bail 13. Again, it should be understood that the toy can also be used without pulling any wagon or it can be employed to pull or push a different type of wagon or carriage.

The hollow body of a rabbit serves to house the movement proper, generally designated by 14. The movement comprises a substantially rectangular casing or housing 15 secured to the rabbit body by any suitable means for instance soldering. The spring actuated motor disposed within housing 15 comprises a conventional spiral spring 36 which is capable of imparting rotation to a drive shaft 16 through one or more gears when the spring is wound by means of a winding stem 17 and a key 18. Stem 17 is accessible through a suitable opening 19 in the body of the rabbit.

Inasmuch as the previously described arrangement of a spring motor is conventional, a detailed description of the motor does not appear to be essential for the understanding of the invention.

While the spring motor is not shown as being equipped with a brake for the drive shaft, it should be understood that a brake and similar accessories well known in the art of spring actuated toy motors may be provided.

As can best be seen on Fig. 3, shaft 16 protrudes at each end from respective opposite walls of the casing. Each protruding end of the shaft supports a disc 20, 21 respectively for rotation in unison with the drive shaft. Each disc is shown as an ellipse mounted eccentrically on shaft 16. One of the discs, say disc 21, is provided with a dog or nose 22 extending from the respective disc, as can best be seen on Fig. 3. The dog may be disposed in any suitable position relative to the center of rotation of the disc. In the embodiment shown, the dog is mounted in the long axis of the ellipse.

The dog serves to actuate or rock the front legs of the rabbit. The front legs, designated by 23 and 24 respectively, are pivoted to an axle 25 supported on casing 15 or the rabbit body. The two front legs can be mounted independently from each other or, as shown, be joined by a transverse bar 25'. One of the front legs, to wit leg 24, has an extension arm 26 the shape of which can best be seen on Fig. 2. Extension 26 is so shaped that an intermediate portion thereof can abut against the respective protruding end of drive shaft 16 thereby limiting the lifting motion of the legs (rotation of the legs in counter-clockwise direction as seen on Fig. 2). The end portion of the extension extends into the path of dog 22 so that the dog will pivot the legs in counter-clockwise direction, thereby intermittently pressing down the toe portion of the legs when the discs rotate in clockwise direction (as seen on Fig. 2). The rounded portion of extension 26 permits dog 22 to slide smoothly along the extension for a predetermined angular rotation of the discs. To make the toy animal to appear more naturally, a hind leg may be painted on each of the discs.

The operation of the toy animal, as hereinbefore described, is as follows:

Let it be assumed, that all parts are in the position as shown in Fig. 2. Then, the rear part of the rabbit body is in its lowest position and the front legs are also stretched out on the floor or other base on which the animal rests. When now the spring motor is released and the discs rotate in clockwise direction, dog 22 will rotate the front legs in counterclockwise direction, thereby moving the front legs into a steeper position, the toe portion of the legs resting on the ground and the rabbit body being lifted at shaft 25. The rear portion of the rabbit body will remain substantially at the same level by reason of the fact that periphery portion 27 of the discs is resting on the gound when dog 22 is in its highest position. As will be noted, distance $d$ is approximately the same as distance $d'$. Fig. 4 shows this relative position of the parts. As the rotation of the discs continues, dog 22 slides off extension 26, thereby permitting the front legs to return into their substantially prone position. Upon further rotation of the discs, the rear part of the animal is lifted reaching its highest position when the side of the discs in which the dog is disposed is on the ground. The front legs remain prone since the dog is disengaged from extension 26. Fig. 5 shows the position of the animal in which the rear portion of the body is lifted to its highest point and the front legs are substantially prone.

As soon as dog 22 reengages the extension, the front legs are again moved into the previously described steeper position while the rear part of the animal is lowered, the flatter portion of the discs being now in engagement with the ground. Fig. 6 shows this relative position of the parts.

The same cycle is repeated until the spring motor is run down.

As will appear from the previous description, the body of the animal and its front legs are alternately lifted at the front end and the rear end. At the same time, the rotation of the discs causes forward movement of the rabbit, thereby simulating the natural hopping motions of a rabbit.

It will be evident from the previous description that the relative motions of the front and hind legs of the rabbit can be varied by changing the position of dog 22 or by providing several dogs in case more rapid movements of the front legs are desired. Further changes of the relative motions can be attained by varying the shape or the mounting of the discs.

According to the embodiment shown in Fig. 7, circular discs 28 are provided which are eccentrically mounted. It will be evident that an eccentrically mounted circular disc will also cause alternate lifting and lowering of the front legs and the body of the animal.

Another variation would be to provide elliptic discs centrically mounted rather than eccentrically, as shown on Fig. 2.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claim.

What is claimed as new and desired to be secured by Letters Patent is:

In a toy figure representing a rabbit type animal and animated for imitating the natural hobbling motions of such animal, in combination a hollow body shaped to simulate the body of the animal, a spring actuated motor mounted within the hollow body, said motor including a drive shaft disposed transversely to the hollow body and protruding at both ends from the portion of the hollow body simulating the hind end of the animal, a pair of elliptic discs, each eccentrically secured to one of said protruding shaft ends for supporting the hind end of the animal on a base, each shaft end being secured to the respective disc at a point situated in a section of the long axis of the disc spaced apart from the disc center, one of the shaft ends protruding from the respective disc, a pair of front legs pivoted to the portion of the hollow body simulating the front part of the animal near the base thereof and interconnected for joint pivotal movement, the leg on the side of the hollow body on which the respective shaft end protrudes from the disc being rearwardly extended so as to reach over the said shaft end, a nose extending from the disc from which the said shaft end protrudes on the side of the disc facing the leg extension and situated in a section of the long axis of the respective disc opposite to the aforesaid axis part in relation to the center of the respective disc, the said leg extension being engageable with the nose and the protruding shaft end, the said front legs, the leg extension, the protruding shaft end of the nose being disposed in a spatial relationship so that the nose and the said protruding shaft end alternately impart a rocking motion to the leg extension which motion pivots the front legs between a substantially prone position and a position in which the paw ends of the legs rest upon the base in response to a rotation of said drive shaft.

ERNEST FIELDS.

REFERENCES CITED

The following references are of record in the file of this patent:

UNITED STATES PATENTS

| Number | Name | Date |
| --- | --- | --- |
| 1,649,533 | Huckins | Nov. 15, 1927 |
| 1,699,139 | Fuld | Jan. 15, 1929 |
| 1,717,141 | Brubaker | June 11, 1929 |
| 2,013,709 | Boissoneau | Sept. 10, 1935 |
| 2,398,290 | Dahlstrom | Apr. 9, 1946 |